March 12, 1935.    B. H. CLASPY ET AL    1,993,873
HYDRAULIC BRAKE APPARATUS
Filed Feb. 12, 1931

INVENTOR
Bert H. Claspy
Charles R. White
BY
Chappell Earl
ATTORNEYS

Patented Mar. 12, 1935

1,993,873

UNITED STATES PATENT OFFICE 1,993,873

HYDRAULIC BRAKE APPARATUS

Bert H. Claspy and Charles R. White,
Dowagiac, Mich.

Application February 12, 1931, Serial No. 515,178

8 Claims. (Cl. 303—84)

The main objects of this invention are:

First, to provide in a hydraulic brake apparatus having a plurality of actuated units or pairs of units, such as the front and rear wheel brakes of a motor vehicle, means whereby, in the event of breakage of the line in one of the actuating fluid conduits or passages, such conduit is automatically closed leaving the apparatus controlled through the other conduit in operative condition.

Second, to provide in an apparatus of the class described means whereby the actuating fluid passages or conduits are normally open for the passage of fluid from the actuating cylinder, but which are automatically closed on an excessive flow or surge of fluid in the passage.

Third, to provide an apparatus of this character which may be easily installed in motor vehicles employing hydraulic brakes now extensively in use.

Objects pertaining to details and economies of our invention will appear from the description to follow. The invention is defined in the claims.

A structure embodying the features of our invention is illustrated in the accompanying drawing in which.

Figure 1:
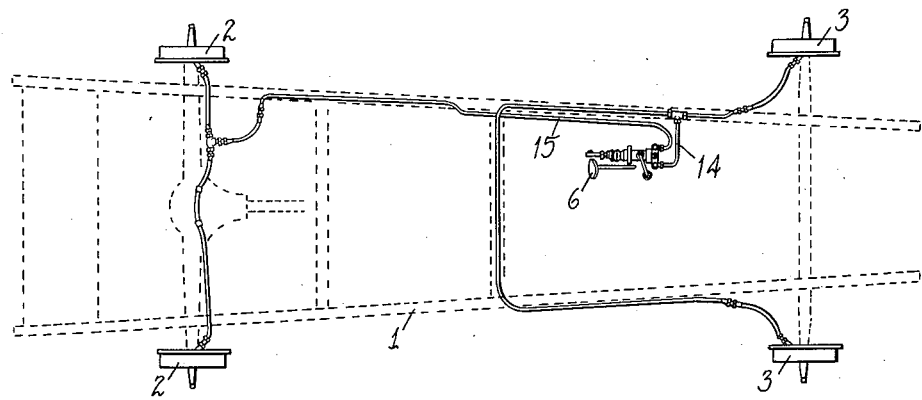
Fig. 1 is a diagrammatic plan view of our improved hydraulic brake as applied to a motor vehicle, the parts of the vehicle being indicated by dotted lines.
Figure 2:
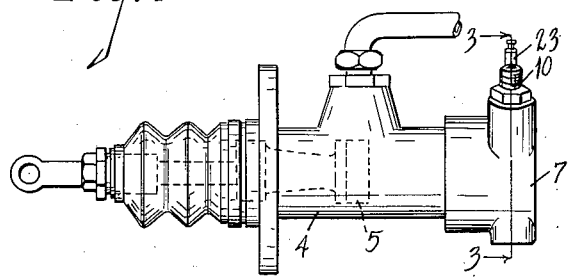
Fig. 2 is a fragmentary side elevation of the actuating cylinder of our improved brake apparatus.

In the accompanying drawing 1 represents a chassis of a motor vehicle, 2 the rear wheel brake units and 3 the front wheel brake units. These are conventionally indicated.

The cylinder 4 is provided with a plunger 5 connected to be actuated from the foot pedal 6. The cylinder is provided with a head 7 having a vertical bore 8 therein communicating with the cylinder and a pair of upwardly diverging vertical bores 9 constituting elongated valve chambers or valve chambers of substantial length. These valve chambers open to the lower end of the vertical bore 8.

The outer ends of the bores 9 have valve seat members 10 threaded into the same, these valve seat members also constituting couplings for the conduits 14 and 15 leading to the front and rear brake units respectively.

Valve seats 11 of the members 10 face inwardly to coact with the valves 12 which are floatingly arranged in the valve chambers 9.

The valves 12 are adapted to float or reciprocate in the valve chambers with the pulsations or surges of the actuating fluid under the action of the plunger. However, in the event of an abnormal surge or flow of the fluid such as might be occasioned by the breaking of one of the conduits or pipes 14 or 15 leading to the brake units, the valve is carried by the difference in pressure into coacting relation with the seat 11 and is held against the seat by the pressure and is also retained in seating position by means of the spring detents 13 which engage under friction within the passages 14 of the valve seat member 10.

Before the installation of a new conduit for the ruptured one, or before installing the repaired conduit, the plunger 12 is released by manually disengaging the detent 13 from the passage 14 of the valve seat member with a nail, screw driver, or the like, so as to move the plunger into its bore, the actuating plunger 5 being in its retracted position so as to release the fluid pressure back of the plunger. After the conduit has been installed, the plunger 12 again functions as described above.

Figures 3, 4, 5:
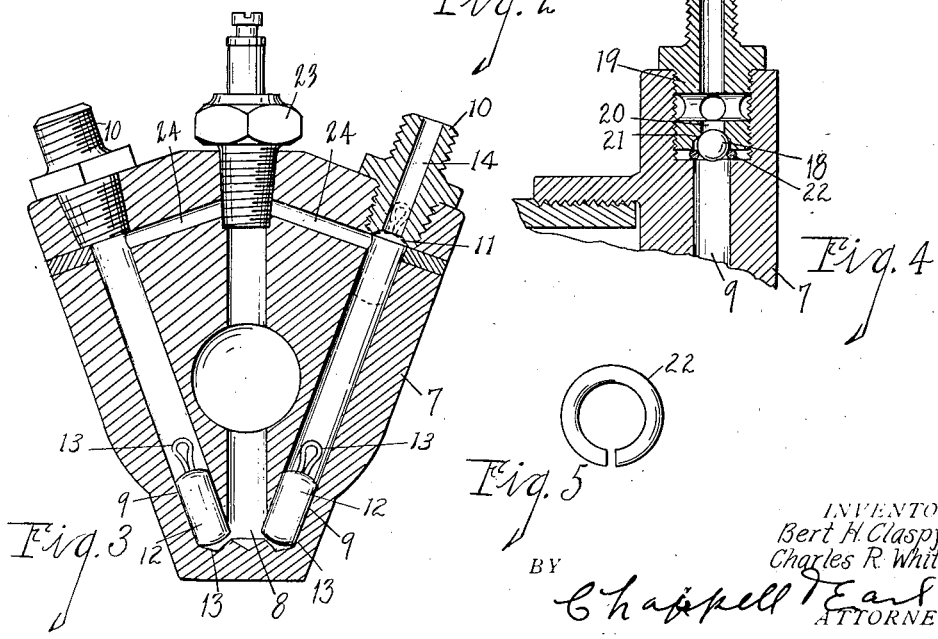
Fig. 3 is an enlarged detail mainly in section on line 3—3 of Fig. 2.
Fig. 4 is a fragmentary section corresponding to that of Fig. 3 of a slightly modified form or embodiment of our invention.
Fig. 5 is a side elevation of one of the valve detents of the embodiment of Fig. 4.

In the embodiment shown in Fig. 4, ball valves 18 are employed, the valve seat members 19 having a port 20 surrounded by valve seat 21. The detent 22 for retaining the valve in its seated position is in the form of a split ring.

With this arrangement of parts the fluid is free to flow or surge under the impulse of the actuating plunger normally, the valves being of such size as not to completely fill the chambers cross-sectionally, thereby providing a by-pass to compensate for slight leakage or equalizing of pressures. At the same time the valves float or reciprocate under the impulses of the actuating fluid and, as stated, are carried to their seats by an excessive impulse such as would be occasioned by breakage in one of the lines, thus closing the line and permitting the other line to remain effective.

The plug 23 is arranged so that when it is completely screwed home it serves as a closure for the passages 24 which open to the valve chambers 9 so that by lifting the plug 23 or partially withdrawing it the brake fluid may be pumped directly into the system, thus being by-passed around the valves 12. This is of particular advantage from the manufacturer's standpoint for the reason that at the time the car comes off the assembling line there is no brake fluid in any of these pipes, and it is pumped in by working the brake pedal. Also, it is of advantage in the event that a portion of the brake fluid is lost as by breaking of one of the conduits.

We have illustrated and described our improvements in an embodiment which we have found highly practical and one readily embodied in various brake mechanisms now commercially used. We have not attempted to illustrate or describe other embodiments or adaptations which might be desirable for other installations as we believe this disclosure will enable those skilled in the art to embody or adapt the same as may be desired.

Having thus described our invention, what we claim as new and desire to secure by Letters Patent is:

1. In a hydraulic brake apparatus, the combination of a cylinder and coacting plunger, a head for said cylinder provided with a central vertical bore communicating with said cylinder and a pair of upwardly diverging bores opening at their lower ends to said vertical bore and constituting valve chambers, valve seat members threaded into the upper ends of said valve chambers and provided with downwardly facing valve seats and ports positioned centrally thereof, valves freely movable in said valve chambers, and keepers disposed in spaced relation to said valve seats and acting when the valves are carried to their seats by a surge of fluid to retain them in closed position.

2. In an apparatus of the class described, the combination of an actuating fluid passage having a ball valve arranged for free movement for a substantial distance with the surge or flow of the actuating fluid in the passage and adapted to be carried to closed position by an excessive surge or flow of the actuating fluid, and a split ring for holding said valve in closed position acting to automatically engage the valve when it is carried to its seat.

3. In a hydraulic brake apparatus, the combination of a cylinder having a head provided with a central vertical bore communicating with said cylinder and a pair of upwardly diverging bores opening at their lower ends to said vertical bore and constituting valve chambers, valve seat members threaded into the upper ends of said valve chambers and provided with downwardly facing valve seats and ports, valves freely movable in said valve chambers, and keepers on the upper ends of said valves acting when the valves are carried to their seats by a surge of fluid to engage in the port and retain the valves in closed position.

4. In a hydraulic brake apparatus, a safety fitting provided with a main bore and a plurality of diverging bores opening at their inner ends to said main bore and constituting valve chambers, valve seats and ports at the outer ends of said valve chambers, a valve freely movable in each of said chambers, and means carried by each of said valves for coaction with the port for latching it in closed position.

5. In a hydraulic brake apparatus, the combination of a cylinder having a head provided with a central bore communicating with the cylinder, a pair of diverging bores opening at one end to said central bore, a floating valve in each of said diverging bores, by-pass bores connecting the outer ends of the diverging bores to the central bore, and a plug having a filler opening threaded to said central bore and constituting a closure for the by-pass bores.

6. In a hydraulic brake apparatus, the combination of a cylinder having a head provided with a central bore communicating with the cylinder, a pair of diverging bores opening at one end to said central bore, a floating valve in each of said diverging bores, by-pass bores connecting the outer ends of the diverging bores to the central bore, and a plug threaded to said central bore and constituting a closure for the by-pass bores.

7. In a hydraulic brake apparatus, the combination of an actuating fluid passage, a valve chamber of substantial length in said passage, a valve seat and port at one end of said valve chamber, a valve freely movable in said valve chamber, and a spring keeper mounted on the port end of said valve to secure the latter in closed position by engagement with said port.

8. A safety fitting for hydraulic brake apparatus and the like, provided with a bore constituting a valve chamber, a valve seat and port at one end of said valve chamber, a valve freely movable with the hydraulic fluid in said valve chamber, and means carried by said valve for coaction with said port for latching the valve in closed position.

BERT H. CLASPY.
CHARLES R. WHITE.